(12) United States Patent
Tomita et al.

(10) Patent No.: US 7,871,739 B2
(45) Date of Patent: Jan. 18, 2011

(54) FUEL CELL AND ELECTRONIC DEVICE

(75) Inventors: Takashi Tomita, Kanagawa (JP); Hideki Sakai, Kanagawa (JP); Takaaki Nakagawa, Kanagawa (JP); Mamoru Hatakeyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 659 days.

(21) Appl. No.: 11/623,232

(22) Filed: Jan. 15, 2007

(65) Prior Publication Data
US 2007/0196722 A1 Aug. 23, 2007

(30) Foreign Application Priority Data
Jan. 16, 2006 (JP) ............................... 2006-007248

(51) Int. Cl.
*H01M 4/02* (2006.01)
*H01M 4/36* (2006.01)
*H01M 4/86* (2006.01)
*H01M 4/96* (2006.01)

(52) U.S. Cl. ....................................................... 429/531
(58) Field of Classification Search ................... 429/43
See application file for complete search history.

(56) References Cited

U.S. PATENT DOCUMENTS

| | | | |
|---|---|---|---|
| 6,060,188 A * | 5/2000 | Muthuswamy et al. | 429/31 |
| 2003/0087144 A1 * | 5/2003 | Sun et al. | 429/43 |
| 2004/0001987 A1 * | 1/2004 | Kinkelaar et al. | 429/34 |
| 2004/0048111 A1 * | 3/2004 | Halme et al. | 429/2 |
| 2004/0101741 A1 * | 5/2004 | Minteer et al. | 429/43 |
| 2007/0218345 A1 * | 9/2007 | Sakai et al. | 429/43 |

FOREIGN PATENT DOCUMENTS

| | | |
|---|---|---|
| JP | 2000-133297 | 5/2000 |
| JP | 2003-282124 | 10/2003 |
| JP | 2004-71559 | 3/2004 |
| JP | 2005-013210 | 1/2005 |
| WO | WO 2005122315 A1 * | 12/2005 |

* cited by examiner

*Primary Examiner*—Melvin C Mayes
*Assistant Examiner*—Michael Forrest
(74) *Attorney, Agent, or Firm*—K&L Gates LLP

(57) ABSTRACT

A fuel cell and an electronic device equipped therewith are disclosed. The fuel cell is of the type having a cathode and an anode facing each other with a proton conductor interposed therebetween, with at least either of the cathode or anode having an enzyme as a catalyst immobilized thereon, wherein at least a first cathode, a first proton conductor, an anode, a second proton conductor, and a second cathode are sequentially placed thereon, and in fuel is held in contact with at least part of the anode.

17 Claims, 9 Drawing Sheets

FUEL CELL AND ELECTRONIC DEVICE

CROSS REFERENCES TO RELATED APPLICATIONS

The present application claims priority to Japanese Patent Application JP 2006-007248 filed in the Japanese Patent Office on Jan. 16, 2006, the entire contents of which being incorporated herein by reference.

BACKGROUND

The present application relates to a fuel cell and an electronic device equipped therewith, the fuel cell being characterized in that at least either of its cathode or anode has an enzyme as a catalyst immobilized thereon.

A fuel cell typically includes a cathode (oxidizer electrode) and an anode (fuel electrode), which face each other with an electrolyte (proton conductor) interposed between them. It generates electric energy by the following mechanism. The anode is supplied with fuel (hydrogen), which is oxidized and decomposed into electrons and protons ($H^+$), with the former moving to the anode and the latter moving to the cathode through the electrolyte. The cathode is supplied with oxygen from the outside and electrons from the anode through an external circuit. Reaction takes place on the cathode between oxygen, protons, and electrons to give $H_2O$.

Being based on the foregoing principle, a fuel cell is an efficient electric power generator that converts fuel's chemical energy directly into electric energy. In other words, it generates electric energy efficiently from chemical energy possessed by fossil fuel such as natural gas, petroleum, and coal at any time and any place. For this reason, active research and development works have been made to exploit fuel cells as large-scale power generators. An example of successful attempts is the fuel cell mounted on the space shuttle, which not only generated electric power but also supplied crew with water without environmental pollution.

Among recent notable achievements is the development of fuel cells of solid polymer type which operates at comparatively low temperatures ranging from room temperature to about 90° C. Such fuel cells are expected to find use not only as large-scale power generators but also as small-scale portable power generators for automobiles and personal computers.

Thus, fuel cells are attracting attention for their possible use as efficient power generators that operate on any scale. Unfortunately, they still involve many problems. That is, they consume limited global resources so long as they rely on hydrogen gas converted from natural gas, petroleum, and coal through a reformer. They need heating at high temperatures, and they also need catalysts of expensive precious metal such as platinum (Pt). In addition, their fuel, such as hydrogen gas and methanol, requires handling precautions.

With a view to addressing the above-mentioned problems, there has been proposed a fuel cell based on the principle of the metabolism in living organisms which is a highly efficient energy conversion mechanism. The term "metabolism" embraces respiration and photosynthesis that take place in the cells of microorganisms. Metabolism in living organisms performs very efficient power generation and proceeds under mild conditions at room temperature.

Respiration is made up of intake of nutrients (such as saccharides, fats, and proteins) into microorganisms or cells, enzymatic reactions to form carbon dioxide ($CO_2$) through the glycolytic pathway and tricarboxylic acid (TCA) cycle, reduction to convert nicotinamide adenine dinucleotide ($NAD^+$) into nicotinamide adenine dinucleotide in reduced form (NADH), thereby generating oxidation-reduction energy or electric energy, direct conversion of the electric energy of NADH into the electric energy of proton gradient in the electron transport system, and reduction of oxygen into water. The thus generated electric energy forms ATP from adenosine diphosphate (ADP) with the help of adenosine triphosphate (ATP) synthetase, and the resulting ATP is used for reactions that help the growth of microorganisms and cells. This energy conversion takes place in cytosol and mitochondria.

Photosynthesis is a mechanism to generate electric energy from light energy by reduction of nicotinamide adenine dinucleotide phosphate ($NADP^+$) into nicotinamide adenine dinucleotide phosphate (NADPH) in reduced form through the electron transport system, with evolution of oxygen by oxidation of water. The resulting electric energy is used for carbon assimilation from $CO_2$ and synthesis of carbohydrates.

Efforts to apply the metabolism in living organisms to fuel cells has been realized in the microorganism battery (reported in Japanese Unexamined Patent Application Publication (JP-A) No. 2000-133297) which causes microorganisms to generate electric energy and sends the thus generated electric energy (electrons) to electrodes outside microorganisms through an electron mediator, so that the battery supplies electric current.

However, conversion of chemical energy into electric energy by microorganisms and cells is not sufficiently efficient because it involves many unnecessary reactions other than desired ones. Thus the above-mentioned method is poor in energy conversion efficiency.

On the other hand, there has been proposed a bio-fuel cell which permits only desired reactions to take place with the help of an enzyme, as disclosed in JP-A-2003-282124, JP-A-2004-71559, and JP-A-2005-13210. It is so designed as to decompose fuel into protons and electrons by means of an enzyme. Its fuel includes alcohols (such as methanol and ethanol) and monosaccharides such as glucose.

SUMMARY

Bio-fuel cells available now, however, do not necessarily produce sufficient output. Thus there is a need to provide a fuel cell capable of producing a large amount of output and an electronic device equipped therewith, the fuel cell being characterized in that at least either of its cathode or anode has an enzyme as a catalyst immobilized thereon.

A first aspect of the present application is directed to a fuel cell of the type having a cathode and an anode facing each other with a proton conductor interposed between them, with at least either of the cathode or anode having an enzyme as a catalyst immobilized thereon, wherein at least a first cathode, a first proton conductor, an anode, a second proton conductor, and a second cathode are sequentially placed one over another, and fuel is held in contact with at least part of the anode.

The foregoing fuel cell typically has a container which holds fuel in contact with at least part of the anode. This container should preferably have a baglike shape to enclose the anode completely, so that it holds fuel in contact with the entire anode. However, fuel may be held at any place, for example, outside the laminate structure made up of a first cathode, a first proton conductor, an anode, a second proton conductor, and a second cathode, so that fuel is supplied to the anode.

The container may have any shape, closed or unclosed. The container of closed type permits the fuel cell to be used in any position. This is desirable for the fuel cell installed in mobile equipment. The closed container is provided with an inlet and an outlet, so that the fuel cell works continuously as long as the container is replenished with fuel through the inlet. The container may be formed from any material which is impervious to fuel. The material may be the same one as used for the first and second proton conductors (separator). In this case, part of the container serves as the constituent of the first and second proton conductors. The container enclosing the entire anode may be formed in two parts. The first part, which is held between the first cathode and the anode and between the second cathode and the anode, is formed from the proton conductor. Thus this part serves as the first and second proton conductors. The second part is formed from any other materials than used for the first and second proton conductors.

The fuel cell mentioned above has at least a first cathode, a first proton conductor, a first anode, a spacer permeable to fuel, a second anode, a second proton conductor, and a second cathode, which are placed one over another to form a laminate structure. It also has a first current collector connected to a first cathode, a second current collector connected to a first anode, a third current collector connected to a second anode, and a fourth current collector connected to a second cathode. The second and third current collectors may be formed separately or in one.

The fuel container should hold fuel in such a way that fuel comes into contact at least partly with the first and second anodes.

The fuel cell according to the first aspect has at least a first gas-permeable spacer, a first cathode, a first proton conductor, an anode, a second proton conductor, a second cathode, and a second gas-permeable spacer, which are placed one over another to form a laminate structure. These spacers may be formed from various materials, such as insulator, metal (with low resistance), and carbon. A porous material is desirable for easy passage of fuel or gas. The first and second anodes may be connected to each other through a current collector.

No restrictions are imposed on the shape of the first cathode, the first proton conductor, the anode, the second proton conductor, and the second cathode. Acceptable shapes include cuboid, cylinder, plate, and column with a triangular, C-shaped, or L-shaped cross section. The cylindrical shape is formed from at least a first cathode, a first proton conductor, an anode, a second proton conductor, and a second cathode which are placed one over another in such a way that they cover the central axis made of a gas-permeable material.

At least one of the first anode, the anode (or the first and second anodes), and the second cathode should have an enzyme immobilized thereon, which is selected from various ones according to need. The enzyme should preferably be used in combination with an electron mediator, which is also immobilized. Typically, the anode has an enzyme immobilized thereon. This enzyme is an oxidase that oxidizes and decomposes monosaccharides in the case where the fuel cell consumes a monosaccharide (such as glucose) as its fuel. The oxidase is usually used in combination with a coenzyme oxidase which returns the coenzyme, which has been reduced by the oxidase, into its oxidized form. When this coenzyme oxidase returns the coenzyme into its oxidized form, electrons are generated, and the thus generated electrons are transferred from the coenzyme oxidase to the electrode through the electron mediator. The oxidase includes, for example, $NAD^+$-dependent glucose dehydrogenase (GDH); the coenzyme includes, for example, nicotinamide adenine dinucleotide ($NAD^+$); and the coenzyme oxidase includes, for example, diaphorase.

In the case where the fuel cell consumes as its fuel a polysaccharide (which, in a broad sense, includes oligosaccharides such as di-, tri-, and tetra-saccharides, and any other carbohydrates that give two or more molecules of monosaccharide upon hydrolysis), the above-mentioned oxidase, coenzyme oxidase, coenzyme, and electron mediator should preferably be immobilized in combination with a catabolic enzyme that promotes the decomposition (hydrolysis) of polysaccharides to give monosaccharides (such as glucose). Examples of the polysaccharide include starch, amylose, amylopectin, glycogen, cellulose, maltose, sucrose, and lactose. Each of them is made up of two or more monosaccharides and contains glucose as the bonding monosaccharide. Incidentally, amylose and amylopectin are components contained in starch, and hence starch is a mixture of amylose and amylopectin. The catabolic enzyme for polysaccharides may be glucoamylase and the oxidase to decompose monosaccharides may be glucose dehydrogenase. In this case, the fuel to generate electric power may be any of polysaccharides (such as starch, amylose, amylopectin, glycogen, and maltose) which is decomposed to glucose by glucoamylase. Incidentally, glucoamylase is a catabolic enzyme that hydrolyzes α-glucan to give glucose, and glucose dehydrogenase is an oxidase that oxidizes β-D-glucose to D-glucono-δ-lactone. The fuel cell may be constructed such that the catabolic enzyme to decompose polysaccharides is immobilized on the anode and the polysaccharide which is eventually consumed as fuel is also immobilized on the anode.

Starch that is consumed as fuel may be in the form of gel-like solid fuel obtained by gelatinization of starch. In this case, gelatinized starch may be brought into contact with the anode having enzymes immobilized thereon or may be immobilized on the anode together with enzymes. The thus treated anode keeps a higher starch concentration on its surface than in the case where starch is dissolved in a solution. This promotes enzymatic decomposition and increases output. In addition, solid fuel is easier to handle than liquid fuel and suitable for a simple fuel supply system. The fuel cell with it can operate in any position, which is advantageous when it is built into mobile equipment.

The enzyme immobilized on the first and second cathodes is typically an oxidase. Examples of the oxidase include bilirubin oxidase, laccase, and ascorbic acid oxidase. In this case, the first and second cathodes should preferably have an electron mediator immobilized thereon in addition to the enzyme. The electron mediator includes, for example, potassium hexacyanoferrate, potassium ferricyanate, and potassium octatcyanotungstate. The immobilized electron mediator should have a sufficiently high concentration, say $0.64 \times 10^{-6}$ mol/mm$^2$ or above on average.

The first and second cathodes and the anode (or the first and second anodes) may be formed from any known materials such as carbonaceous material. They may also be formed from a porous conducting material composed of a skeleton of porous material and a coating layer of carbonaceous material covering at least part of the skeleton. The porous conducting material is obtained by coating the surface of a skeleton of porous material partly with a material composed mainly of carbonaceous material. The skeleton for the porous conducting material is not specifically restricted so long as it has high degree of porosity and sufficient strength, and it may or may not be electrically conductive. A preferred porous material is one which has a high degree of porosity and conductivity. Such a porous material may be formed from metallic materials (metal or alloy) and carbonaceous materials with reinforced skeleton for reduced brittleness. There is a large variety of porous metallic materials to be selected according to their solution pH and potential. Readily available among them are foamed metal or alloy prepared from nickel, copper, silver, gold, nickel-chrome alloy, and stainless steel. Additional porous materials (other than the foregoing metallic or carbonaceous ones) are resinous porous ones in spongy form. These porous materials should have an adequate porosity and pore diameter which depend on the thickness of the carbonaceous coating material applied onto the surface of the porous skeleton. They should usually have a pore diameter of 10 nm to 1 mm, typically 10 nm to 600 µm. The skeleton covering material should be conductive and stable at the expected operating potential. Any one of carbonaceous materials is used in this embodiment because of their good chemical stability and broad potential window. Such materials may optionally contain a small amount of ancillary materials according to the characteristic properties required of porous conductive materials. Examples of the ancillary materials include metals and other highly conductive materials which increase the electrical conductivity of the carbonaceous materials and polytetrafluoroethylene and other similar materials which impart water repellency to the carbonaceous materials. The carbonaceous materials may contain some additional elements. The major constituent of the carbonaceous materials should preferably be finely divided carbon powder with a high conductivity and a large surface area, such as Ketjen black (as highly conductive carbon) and fullerene and carbon nanotube (as functional carbon). The carbonaceous material may be applied to the surface of the porous skeleton in any manner with the help of binder, if necessary. The pore diameter of the porous conducting material should be large enough for the solution (containing the substrate) to pass through easily; it is 9 nm to 1 mm, preferably 1 µm to 1 mm, more preferably 1 µm to 600 µm. The coating on the porous skeleton with the carbonaceous material should be made such that it keeps all pores open without clogging.

The electrolyte used as the first and second proton conductors may contain a buffer solution for the enzyme to fully exhibit its inherent potential when the fuel cell produces it maximum output. The buffer should be contained in the electrolyte in concentrations of 0.2-2.5 M, preferably 0.2-2 M, more preferably 0.4-2 M, and most desirably 0.8-1.2 M. The buffer is not specifically restricted so long as it has a $pK_a$ value of 6 to 9. It includes, for example, dihydrogen phosphate ion ($H_2PO_4^-$), 2-amino-2-hydroxymethyl-1,3-propanediol (Tris for short), 2-(N-morpholino)ethanesulfonic acid (MES), cacodylic acid, carbonic acid ($H_2CO_3$), hydrogen citrate ion, N-(2-acetamide) iminodiacetic acid (ADA), piperadine-N,N-bis(2-ethanesulfonic acid) (PIPES), N-(2-acetamide)-2-aminoethanesulfonic acid (ACES), 3-(N-morpholino)propanesulfonic acid (MOPS), N-2-hydroxyethylpiperadine-N'-2-ethanesulfonic acid (HEPES), N-2-hydroxyethylpiperadine-N'-3-propanesulfonic acid (HEPPS), N-[tris(hydroxymethyl) methyl]glycine (Tricine for short), glycidyl glycine, and N,N-bis(2-hydroxyethyl)glycine (bicine for short). Dihydrogen phosphate ion ($H_2PO_4^-$) is generated from sodium dihydrogen phosphate ($NaH_2PO_4$) and potassium dihydrogen phosphate ($KH_2PO_4$). The buffer-containing electrolyte should preferably have a pH value of about 7, which may range from 1 to 14 in general.

The fuel cell according to the first aspect may be variable in size and applicable to any machines and equipment which need electric power, such as electronic devices, vehicles (including automobiles, motor cycles, aircraft, rockets, and spacecraft), power plant, construction machines, machine tools, power generation system, and cogeneration system. Its application determines its output, size, shape, and the kind of fuel it consumes.

A second aspect of the present application is directed to a fuel cell of the type having a cathode and an anode facing each other with a proton conductor interposed between them, with at least either of the cathode or anode having an enzyme as a catalyst immobilized thereon, wherein at least a first anode, a first proton conductor, a cathode, a second proton conductor, and a second anode are sequentially placed one over another, and fuel is held in contact with at least part of the first anode and at least part of the second anode.

This fuel cell is different from the one according to the first aspect of the present application in that the arrangement of the cathodes and anodes is reversed. What is mentioned above for the first aspect of the present application is also applied to the second aspect of the present application except that the cathodes and anodes are arranged in the reverse order.

A third aspect of the present application is directed to an electronic device provided with one or more fuel cells, which is characterized in that the fuel cell is that of the type having a cathode and an anode facing each other with a proton conductor interposed between them, with at least either of the cathode or anode having an enzyme as a catalyst immobilized thereon, wherein at least a first cathode, a first proton conductor, an anode, a second proton conductor, and a second cathode are sequentially placed one over another, and fuel is held in contact with at least part of the anode.

The electronic device is not specifically restricted; it may be portable or stationary. Its typical examples include portable telephone, mobile equipment, robots, personal computers, gameplayers, vehicle equipment, household appliance, and industrial products.

What is mentioned above for the first aspect of the present application is also applied to the third aspect of the present application except for the description of the electronic device.

A fourth aspect of the present application is directed to an electronic device provided with one or more fuel cells, which is characterized in that the fuel cell is that of the type having a cathode and an anode facing each other with a proton conductor interposed between them, with at least either of the cathode or anode having an enzyme as a catalyst immobilized thereon, wherein at least a first anode, a first proton conductor, a cathode, a second proton conductor, and a second anode are sequentially placed one over another, and fuel is held in contact with at least part of the first anode and at least part of the second anode.

What is mentioned above for the first to third aspects of the present application is also applied to the fourth aspect of the present application unless there is contradiction.

The two kinds of fuel cells according to the fourth aspect as mentioned above may be combined into a compact single unit. The first fuel cell has at least a first cathode and an anode facing each other, with a first proton conductor interposed between them, or the first fuel cell has a first anode and a cathode facing each other, with a first proton conductor interposed between them. The second fuel cell has a second cathode and an anode facing each other, with a second proton conductor interposed between them, or the second fuel cell has a second anode and a cathode facing each other, with a second proton conductor interposed between them. The two fuel cells are combined together in such a way that the anode (or the first anode and the second anode) can be supplied with fuel and the first cathode and the second cathode (or the cathode) can be supplied with oxidizer such as air. The resulting unit made up of the two fuel cells give an output (in terms of voltage or current) which is the sum of outputs from the first and second fuel cells. It is possible to combine together as many units as necessary to generate a larger output (voltage or current).

As discussed above and further discussed below, there is provided a fuel cell capable of generating a large amount of output (voltage or current), and also provided a high-performance electronic device equipped with such a high-output fuel cell.

Additional features and advantages are described herein, and will be apparent from, the following Detailed Description and the figures.

DETAILED DESCRIPTION

A detailed description is provided below according to various embodiments with reference to the drawings.

Figure 1:
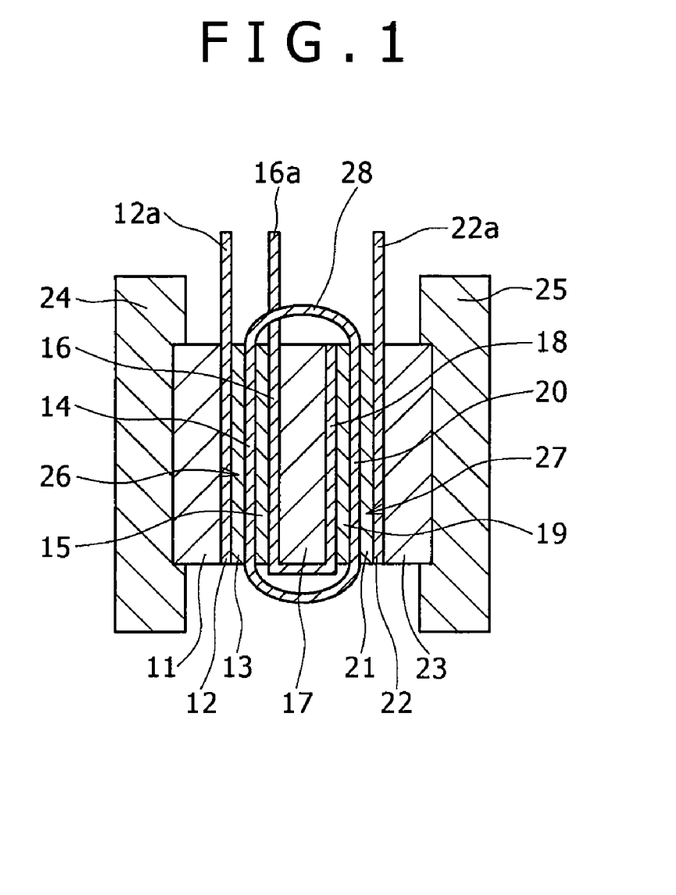
FIG. 1 is a sectional view showing a bio-fuel cell according to an embodiment.
Figure 2:
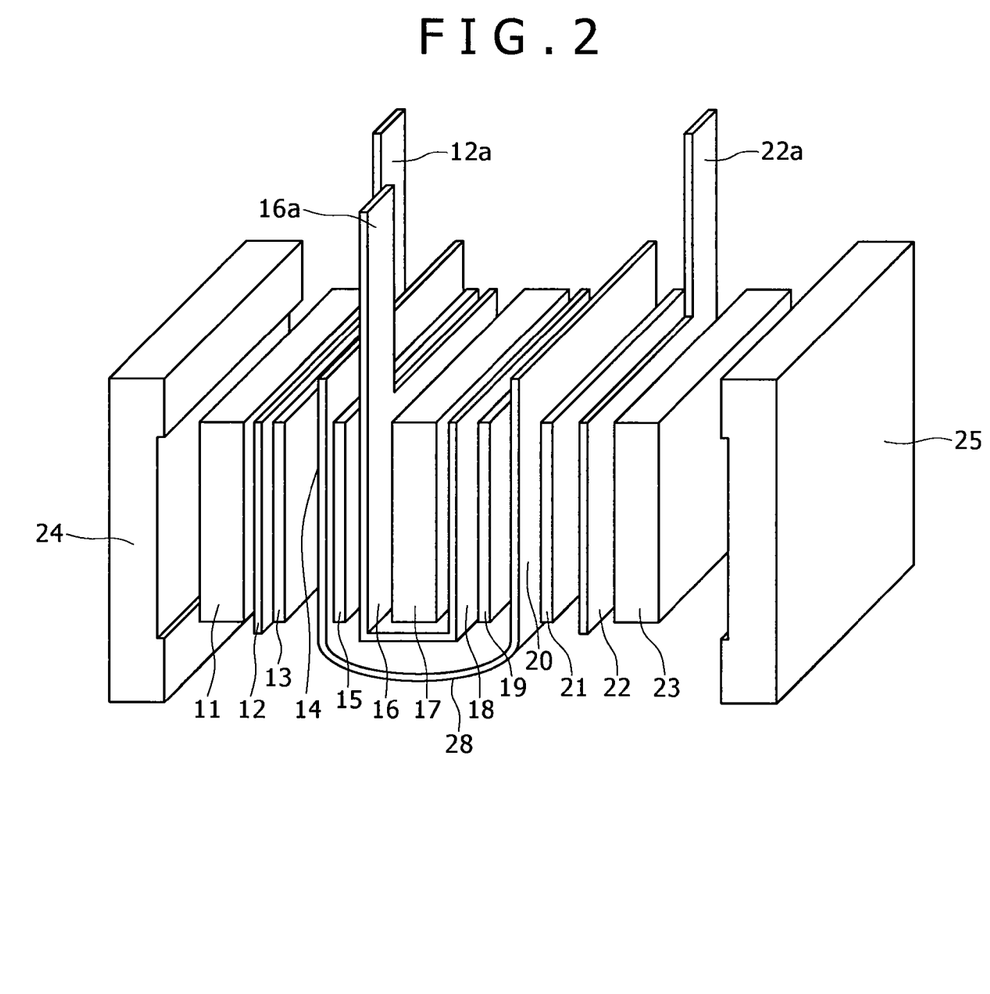
FIG. 2 is an exploded perspective view showing a bio-fuel cell according to an embodiment.

FIGS. 1 and 2 show the bio-fuel cell according to the first embodiment. FIG. 1 is a sectional view showing the laminate structure of the bio-fuel cell, and FIG. 2 shows the constituents of the bio-fuel cell.

The bio-fuel cell shown in FIGS. 1 and 2 is made up of the spacer 11, the cathode current collector 12, the cathode 13, the proton conductor 14, the anode 15, the anode current collector 16, the spacer 17, the anode current corrector 18, the anode 19, the proton conductor 20, the cathode 21, the cathode current collector 22, and the spacer 23, which are placed one over another. They are fixed together in such a way that the spacers 11 and 23 are held between the fixing plates 24 and 25 which are tightened by bolts (not shown). The cathode 13 and the anode 15 facing each other, together with the proton conductor 14 interposed between them, constitute the first fuel cell unit 26, and the cathode 21 and the anode 19 facing each other, together with the proton conductor 20 interposed between them, constitute the second fuel cell unit 27. The spacer 11, the cathode 13, the anode 15, the spacer 17, the anode 19, the cathode 21, and the spacer 23 are usually in the form of rectangular plate of the same size. The anode current collector 16 and the anode current collector 18 are usually formed in one body. The cathode current collector 12, the anode current collector 16, and the cathode current collector 22 have the thin elongate terminals 12a, 16a, and 22a, respectively.

Figure 3:
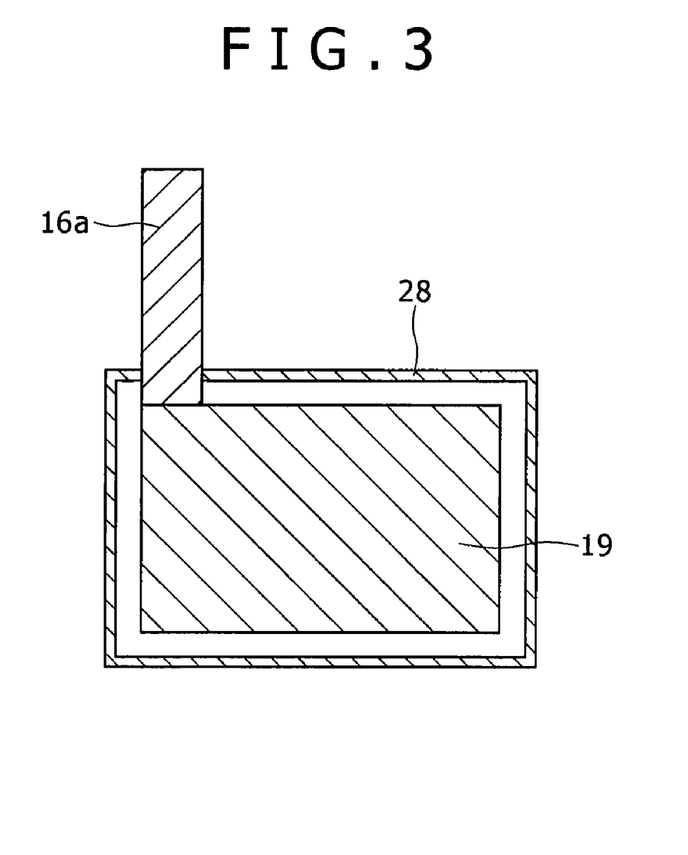
FIG. 3 is a side view showing the fuel container for the bio-fuel cell according to an embodiment.

The fuel container 28, which holds fuel such as glucose solution, is integral with the proton conductors 14 and 20, and it resembles an air-tight bag as a whole. It encloses the anode 15, the anode current collector 16, the spacer 17, the anode current collector 18, and the anode 19, so that it holds fuel in contact with the anodes 15 and 19. It permits the anode current collector 16 and its terminal 16a to project therefrom through a seal (not shown) that prevents fuel leakage. It has a cross section viewed in the direction of lamination, as shown in FIG. 3.

Figure 4:
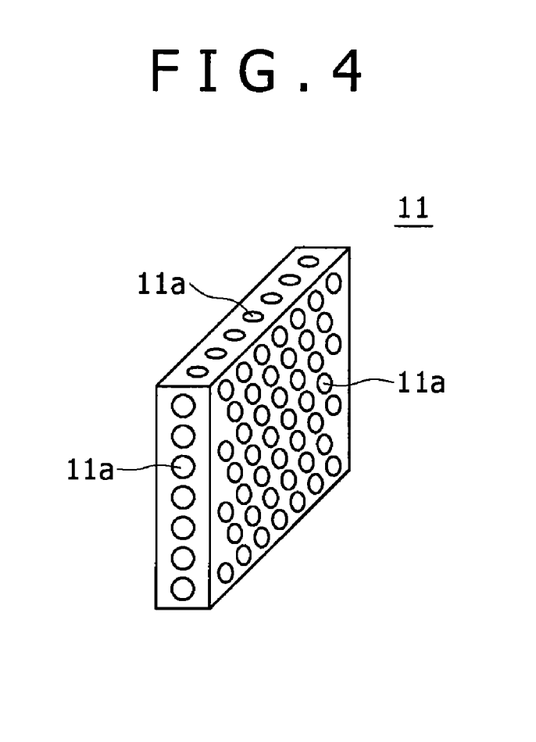
FIG. 4 is a perspective view showing the spacer for the bio-fuel cell according to an embodiment.

The spacers 11 and 23 take in air or oxygen (or any other oxidizer-containing gas) and diffuse it. To be concrete, they are formed from a gas-permeable, electrically insulating material, such as plastics. They usually have the open-cell porous structure that permits a gas to pass through from one side to the other. However, they may have any other structure that permits a gas to pass from the surface not facing the cathodes 12 and 21 to the surface facing the cathodes 12 and 21. To be concrete, they have a large number of penetrating holes with an even or uneven diameter, which are regularly or randomly arranged on both sides thereof. FIG. 4 shows an example of the spacer 11 having a large number of regularly arranged penetrating holes 11a. The spacer 23 looks the same. The spacers 11 and 23 may be easily formed from an acrylic plate.

The spacer 17 functions as a fuel tank to hold fuel such as glucose solution and also as a fuel diffuser. In other words, it is made of a permeable, electrically insulating material such as plastics. It usually has the open-cell porous structure that permits fuel to pass through from one side to the other. However, it may have any other structure that permits fuel to pass from the surface not facing the anodes 15 and 19 to the surface facing the anodes 15 and 19. To be concrete, it has a large number of penetrating holes with an even or uneven diameter, which are regularly or randomly arranged on both sides thereof. It resembles the spacer shown in FIG. 4. It may be easily formed from an acrylic plate as in the case of the spacers 11 and 23.

The cathode current collectors 12 and 22 collect current originating from the cathodes 13 and 21, respectively, and permit collected current to flow outside through the terminals 12a and 22a connected thereto. They are formed from a gas-permeable electrically conductive material which permits an oxidizer-containing gas to be supplied to the cathodes 13 and 21 through them. To be concrete, they are formed from a mesh of metal such as titanium. Likewise, the anode current collectors 16 and 18 collect current originating from the anodes 15 and 19, respectively, and permit collected current to flow outside through the terminal 16a connected thereto. They are formed from a gas-permeable, electrically conductive material which permits fuel to be supplied to the anodes 15 and 19 through them. To be concrete, they are formed from a mesh of metal such as titanium, as in the cathode current collectors 12 and 22.

The anodes 15 and 19 are formed from porous carbon with polymer coating and have immobilized thereon an enzyme, coenzyme, and coenzyme oxidase for decomposition of fuel. They should preferably have immobilized thereon an electron mediator in addition to the enzyme, coenzyme, and coenzyme oxidase. The electron mediator receives electrons, which occur as the result of oxidation of coenzyme by coenzyme oxidase, and transfers them to the electrode. For example, in the case where a glucose solution is used as fuel, the anodes 15 and 19 have a polymer coating on which are immobilized an enzyme involving decomposition of glucose, a coenzyme (such as $NAD^+$ and $NADP^+$) which generates its reduced form upon oxidation in decomposition of glucose, a coenzyme oxidase (such as diaphorase) which oxidizes the coenzyme into reduced form (such as NADH and NADPH), and an electron mediator which receives electrons, which occur as the result of oxidation of coenzyme by coenzyme oxidase, and transfers them to the electrode.

An example of the enzyme involving in decomposition of glucose is glucose dehyrogenase (GDH). This oxidase oxidizes β-D-glucose into D-glucono-δ-lactone. The D-glucono-δ-lactone is decomposed further into 2-keto-6-phospho-D-gluconate by gluconokinase and phosphogluconate dehydrogenase (PhGDH). In other words, D-glucono-δ-lactone changes into D-gluconate upon hydrolysis, and the D-gluconate changes into 6-phospho-D-gluconate through phosphorylation that occurs as adenosine triphosphate (ATP) is decomposed into adenosine diphosphate (ADP) and phosphoric acid in the presence of glucokinase. The 6-phospho-D-gluconate is oxidized into 2-keto-6-phospho-D-gluconate by the oxidase (PhGDH).

Glucose may also undergo glucose metabolism (decomposition into $CO_2$) in addition to the above-mentioned decomposition process. The decomposition process based on the glucose metabolism is divided into three categories—decomposition of glucose through glycolytic pathway, formation of pyruvic acid, and TCA cycle, which are well-known reaction systems.

An oxidation reaction in the decomposition process of a monosaccharide involves a reduction reaction of a specific coenzyme which is peculiar to an enzyme on which it acts. For example, a coenzyme for GDH is $NAD^+$. That is, GDH acts on β-D-glucose for oxidation into D-glucono-δ-lactone and this oxidation reaction reduces $NAD^+$ into NADH, thereby generating protons ($H^+$).

The resultant NADH is immediately oxidized into NAD+ in the presence of diaphorase (DI), thereby giving rise to two electrons and two protons ($H^+$). In other words, one molecule of glucose yields two electrons and two protons ($H^+$) in one stage of oxidation reaction. Thus it yields four each of electrons and protons ($H^+$) in two stages of oxidation reaction.

After the above-mentioned process, the resultant electrons are transferred from the diaphorase to the anodes 15 and 19 through the electron mediator and the resultant protons ($H^+$) are transferred to the cathodes 13 and 21 through the proton conductors 14 and 20.

Since the electron mediator serves to transfer electrons to the anodes 15 and 19, the output voltage of the fuel cell depends on the oxidation-reduction potential of the electron mediator. For a higher output voltage, the electron mediator adjacent to the anodes 15 and 19 should preferably be one which has a more negative potential. However, it should be adequately selected in consideration of its reaction affinity with enzymes, the rate at which it exchanges electrons with the electrodes, and its structural stability to inhibiting factors (such as light and oxygen). For this reason, the electron mediator for the anodes 15 and 19 should preferably be 2-amino-3-carboxy-1,4-naphthoquinone (ACNQ) or vitamin $K_3$. Other candidates include compounds having the quinone skeleton, metal complexes containing osmium (Os), ruthenium (Ru), iron (Fe), or cobalt (Co), viologen compounds such as benzylviologen, compounds having the nicotinamide structure, compounds having the riboflavin structure, and compounds having the nucleotide-phosphate structure.

The anodes 15 and 19 have the above-mentioned enzyme, coenzyme, and electron mediator immobilized thereon with the help of such material as glutaraldehyde (GA) and poly-L-lysine (PLL) combined together or sodium polyacrylate (PAAcNa) and poly-L-lysine (PLL) combined together. They may be used alone or in combination with any other polymers. The combination of glutaraldehyde and poly-L-lysine produces a synergistic effect of immobilization. Their ratio varies depending on the enzyme and substrate; however, it usually ranges in 1:1, 1:2 to 2:1 for 0.125% solution of glutaraldehyde and 1% solution of poly-L-lysine.

The cathodes 13 and 21 are formed from catalyst-carrying carbon powder or a combination of carbon powder and catalyst powder. The catalyst may be fine particles of platinum (Pt) or fine particles of transition metal, such as iron (Fe), nickel (Ni), cobalt (Co), and ruthenium (Ru), in the form of oxide or alloy with platinum. Each of the cathodes 13 and 21 is formed from a catalyst layer (of catalyst alone or catalyst-containing carbon powder) and a gas diffusion layer of porous carbonaceous material placed on top of the other, with the former being adjacent to each of the proton conductors 14 and 20, respectively. The cathodes 13 and 21 may also have immobilized thereon an oxygen reductase (such as bilirubin oxidase) as the catalyst. In this case, the oxygen reductase should preferably be used in combination with the electron mediator which transfers electrons to the electrodes. The reaction that takes place on the cathodes 13 and 21 in the presence of catalyst is reduction of oxygen (in air) into water with the help of protons ($H^+$) transferred through the proton conductors 14 and 20 and electrons supplied from the anodes 15 and 19.

The proton conductors 14 and 20 are intended to transfer protons ($H^+$) that have occurred on the anodes 15 and 19 to the cathodes 13 and 21. Therefore, they are formed from any material which does not conduct electrons but transfers protons ($H^+$). Typical examples of such a material include cellophane, gelatin, and ion-exchange resin having fluoroine-containing carbon sulfonic acid group (such as Nafion® from DuPont in the US).

The fuel container 28 (except for the part constituting the proton conductors 14 and 20) may be formed from the same material as the proton conductors 14 and 20 or from different materials such as nylon.

The fixing plates 24 and 25 are usually formed from a high-modulus material (metal) such as hard aluminum so that they surely fix the above-mentioned constituents of the fuel cell as they are tightened up with bolts. They should be bolted at adequate positions so that they apply uniform tightening forces to all the constituents of the fuel cell.

The bio-fuel cell constructed as mentioned above works in the following manner when the fuel container is filled with glucose solution as fuel. The anodes 15 and 19 serve as the reaction site where glucose is decomposed by the enzyme and electrons and protons ($H^+$) are generated, and they supply the resultant electrons to the external circuit. The cathodes 13 and 21 serve as the reaction site where water is produced from protons ($H^+$) supplied from the anodes 15 and 19 through the proton conductors 14 and 20, respectively, electrons supplied from the anodes 15 and 19 through the external circuit, and oxygen in air. Thus, the first fuel cell unit 26 (which has the cathode 13 and the anode 15 facing each other, with the proton conductor 14 interposed between them) gives off an output voltage across the terminals 12a and 16a, and the second fuel cell unit 27 (which has the cathode 21 and the anode 19 facing each other, with the proton conductor 20 interposed between them) gives off an output voltage across the terminals 22a and 16a. With the terminals 12a and 22a connected to the terminal 16a through a load, the bio-fuel cell supplies the load with an output current which is the sum of the output current of the first fuel cell unit 26 and the output current of the second fuel cell unit 27.

The bio-fuel cell according to the first embodiment mentioned above offers the advantage of making it possible to unify the first and second fuel cell units 26 and 27 into a single compact unit in such a way that the cathodes 13 and 21 are supplied with an oxidizer-containing gas and the anodes 15 and 19 are supplied with fuel. This advantage is derived from the fact that the bio-fuel cell includes the spacer 11 permeable to oxidizer-containing gas, the cathode current collector 12, the cathode 13, the proton conductor 14, the anode 15, the anode current collector 16, the spacer 17 permeable to fuel, the anode current corrector 18, the anode 19, the proton conductor 20, the cathode 21, the cathode current collector 22, and the spacer 23 permeable to oxidizer-containing gas, which are sequentially placed one over another, and that the bio-fuel cell has the fuel container 28 which encloses the anode 15, the anode current collector 16, the spacer 17, the anode current collector 18, and the anode 19. Because of this structure, the bio-fuel cell produces a much larger output current and voltage than the traditional ones.

The following is a description of the bio-fuel cell according to the second embodiment.

Figure 5:
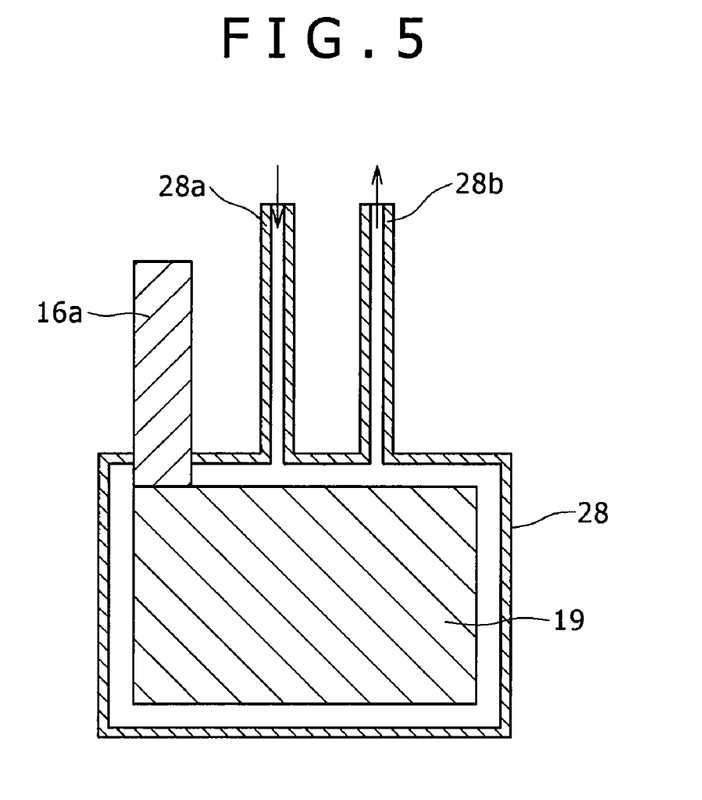
FIG. 5 is a side view showing the fuel container for the bio-fuel cell according to an embodiment.

This bio-fuel cell differs from the one according to the first embodiment in that it is supplied with fuel continuously. As shown in FIG. 5, it is constructed such that the fuel container 28 has the fuel charging tube 28a and the fuel discharging tube 28b for continuous fuel supply. Except for this structure, the second embodiment is identical with the first embodiment.

The second embodiment offers the same advantage as the first embodiment, and it offers the additional advantage that the bio-fuel cell can be run continuously because it is supplied with fuel continuously.

The following is a description of the bio-fuel cell according to the third embodiment.

This bio-fuel cell differs from the one according to the first embodiment in that it includes more than one combination of the first and second fuel cell units 26 and 27, with individual combinations electrically separated from each other by an insulating layer (not shown). Except for this structure, the third embodiment is identical with the first embodiment.

The third embodiment offers the advantage of producing a very large amount of output because of the repeated combination of the first and second fuel cell units 26 and 27.

The following is a description of the bio-fuel cell according to the fourth embodiment of the present application. This bio-fuel cell differs from the one according to the first embodiment in that its constituents are arranged around a central axis instead of being arranged parallel to each other.

Figure 6:
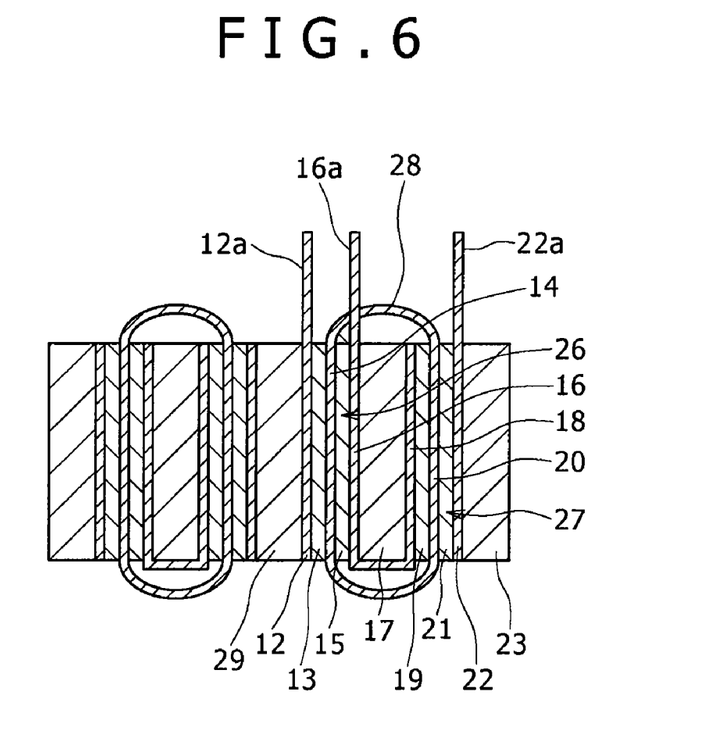
FIG. 6 is a longitudinal sectional view showing the bio-fuel cell according to an embodiment.
Figure 7:
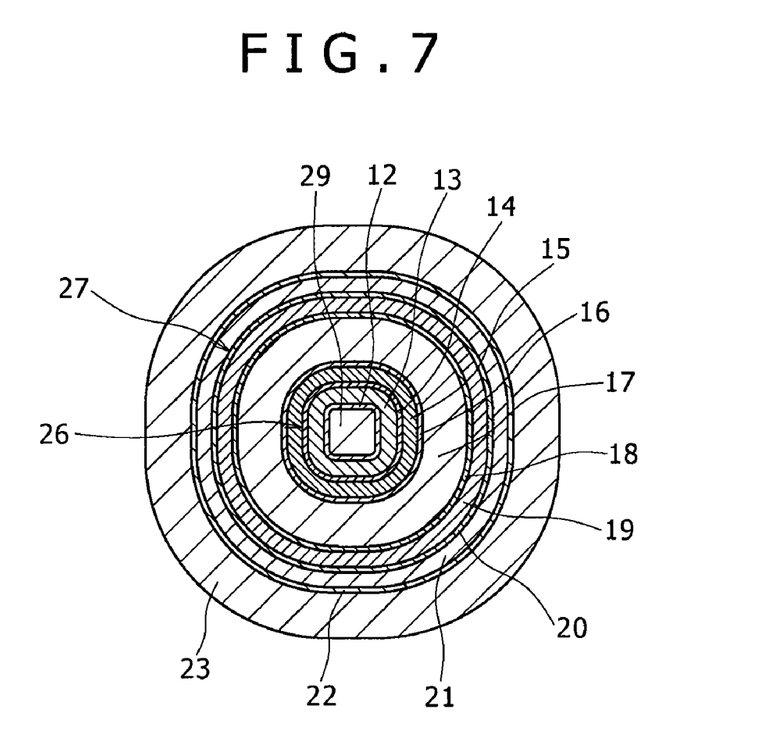
FIG. 7 is a cross sectional view showing the bio-fuel cell according to an embodiment.

This bio-fuel cell is shown in FIGS. 6 and 7 in longitudinal section and cross section, respectively. It includes the cathode current collector 12, the cathode 13, the proton conductor 14, the anode 15, the anode current collector 16, the spacer 17, the anode current corrector 18, the anode 19, the proton conductor 20, the cathode 21, the cathode current collector 22, and the spacer 23, which are so arranged as to sequentially encircle the central axis 29. The central axis 29 may have a square cross section (as shown) or a round cross section. This bio-fuel cell is identical with the one according to the first embodiment except that the central axis 29 is formed from a material permeable to an oxidizer-containing gas like the spacers 11 and 23. The fourth embodiment offers the same advantage as the first embodiment.

The following is a description of the bio-fuel cell according to the fifth embodiment.

This bio-fuel cell differs from the one according to the fourth embodiment in that it includes more than one combination of the first and second fuel cell units 26 and 27 arranged around the central axis 29, with individual combinations electrically separated from each other by an insulating layer (not shown). Except for this structure, the fifth embodiment is identical with the first and fourth embodiments.

The fifth embodiment offers the same advantage as the third embodiment.

The following is a description of the bio-fuel cell according to the sixth embodiment.

This bio-fuel cell differs from the one according to the first embodiment in that it has the anodes 15 and 19 formed from a porous electrically conductive material as shown in FIG. 8.

Figure 8A:
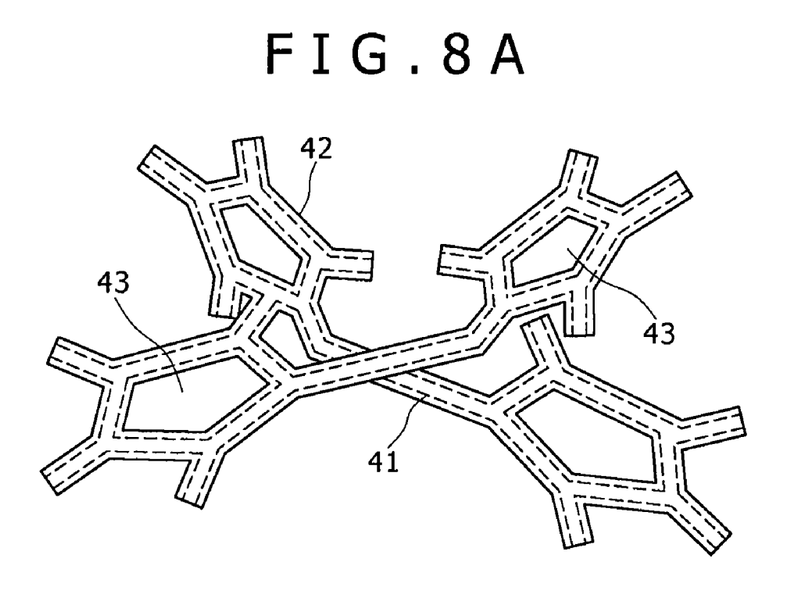
FIG. 8 is a schematic diagram and a sectional view illustrating the structure of the porous conducting material for the electrodes in the bio-fuel cell according to an embodiment.
Figure 8B:
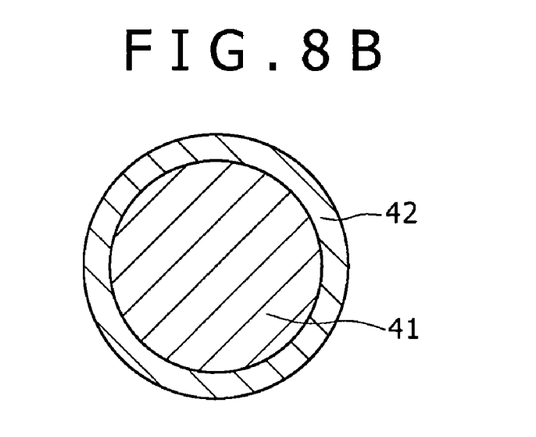

The porous electrically conductive material has a structure as schematically shown in FIG. 8A and also has a sectional structure as shown in FIG. 8B. As shown in FIGS. 8A and 8B, it is composed of the skeleton 41 (of porous material with a three-dimensional reticulate structure) and a coating layer 42 (of carbonaceous material) formed thereon. Because of its reticulate structure, it has a large number of holes 43 (communicating with each other) encircled by the carbonaceous material 42. The carbonaceous material 42 may be fibrous (needlelike) or particulate.

The porous material constituting the skeleton 41 should be foamed metal or alloy, such as foamed nickel. The skeleton 41 should have a porosity higher than 85%, preferably higher than 90%, and a pore diameter of 10 nm to 1 mm, preferably 10 mu to 600 μm, more preferably 1 μm to 600 μm, most desirably 50 μm to 300 μm, and typically 100 μm to 250 μm. The carbonaceous material 42 should be selected from highly conductive ones such as Ketjen black or functional carbonaceous materials such as carbon nanotube and fullerene.

The porous electrically conductive material should have a porosity higher than 80%, preferably higher than 90%, and a pore diameter of 9 nm to 1 mm, preferably 9 nm to 600 μm, more preferably 1 μm to 600 μm, most desirably 30 μm to 400 μm, and typically 80 μm to 230 μm.

The porous electrically conductive material is produced in the following manner.

Figure 9A:
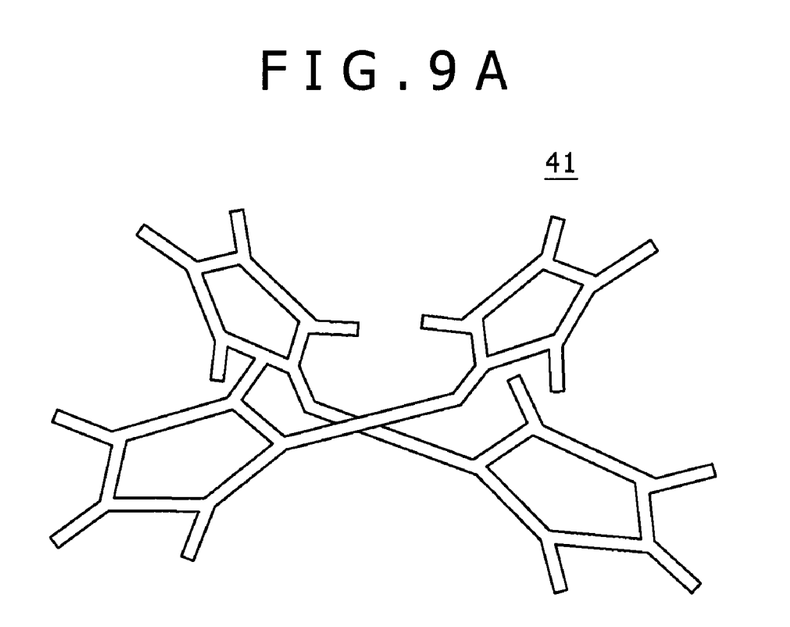
FIG. 9 is a schematic diagram illustrating the process for producing the porous conducting material for the electrodes in the bio-fuel cell according to an embodiment.

The process starts with providing the skeleton 41 of foamed metal or alloy (such as foamed nickel), a shown in FIG. 9A.

Figure 9B:
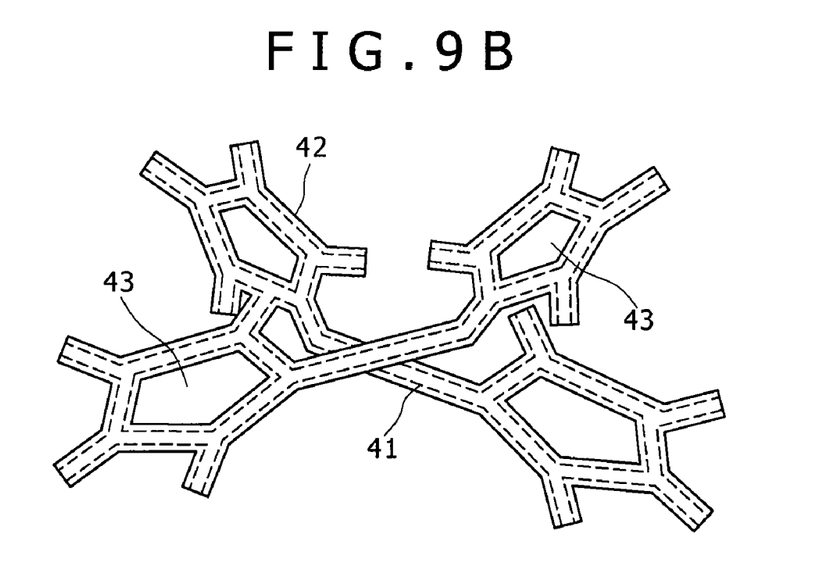

Then, the skeleton 41 of foamed metal or alloy is coated with a carbonaceous material 42 by any known coating method, as shown in FIG. 9B. A typical coating method is spraying with an emulsion containing carbon powder and binder. The coating thickness of the carbonaceous material varies depending on the porosity and pore diameter of the skeleton 41 of foamed metal or alloy and also on the characteristic properties required of the porous electrically conductive material. Coating should be carried out in such a way that the pores 23 surrounded by the carbonaceous material 42 communicate with one another. In this way there is obtained the porous electrically conductive material as desired.

Except for the foregoing, the sixth embodiment is identical with the first embodiment.

The sixth embodiment offers not only the same advantage as the first embodiment but also the following additional advantage. That is, the porous electrically conductive material composed of the skeleton 41 of foamed metal or alloy and the coating layer 42 of carbonaceous material covering the skeleton 41 contains a large number of pores 43 with a sufficiently large pore diameter and a coarse three-dimensional reticulate structure and yet it has high strength and high electrical conductivity and also has a large surface area. Thus, the porous electrically conductive material can be made into the electrode on which are immobilized the enzyme, coenzyme, and electron mediator. The resulting anodes 15 and 19 having the enzyme, coenzyme, and electron mediator immobilized thereon permits the enzyme metabolic reaction to take place efficiently thereon or converts efficiently the enzymatic reaction taking place in the vicinity thereof into electrical signals. Moreover, it remains stable in any environment of operation and hence helps realize the high-performance bio-fuel cell.

The following is a description of the bio-fuel cell according to the seventh embodiment.

This bio-fuel cell relies on starch (polysaccharide) for its fuel. Therefore, it is modified such that the anodes 15 and 19 have glucoamylase immobilized thereon (which is a lyase to decompose starch into glucose).

Upon contact with the anodes 15 and 19, starch as fuel is hydrolyzed into glucose by glucoamylase, and glucose is further decomposed by glucose dehydrogenase. This decomposition process involves oxidation reaction with the result that $NAD^+$ is reduced into NADH, which is subsequently separated into two electrons, $NAD^+$, and $H^+$ on oxidation by diaphorase. In other words, one molecule of glucose gives rise to two electrons and two protons ($H^+$) in one stage of oxidation reaction and four electrons and four protons ($H^+$) in two stages of oxidation reaction. The resulting electrons are transferred to the anodes 15 and 19, and the resulting protons ($H^+$) are transferred to the cathodes 13 and 21 through the proton conductors 14 and 20. On the cathodes 13 and 21, the protons ($H^+$) react with oxygen (supplied from outside) and the electrons (supplied from the anodes 15 and 19 through an external circuit) to give $H_2O$.

Except for the foregoing, the seventh embodiment is identical with the first embodiment.

The seventh embodiment offers not only the same advantage as the first embodiment but also the additional advantage that starch as fuel produces more electrical power than glucose as fuel.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A fuel cell comprising:
a cathode and an anode facing each other with a proton conductor interposed therebetween, with at least either of the cathode or anode having an enzyme as a catalyst immobilized thereon,
wherein at least a first cathode, a first proton conductor, an anode, a second proton conductor, and a second cathode are sequentially placed thereon, and a fuel container encloses the anode to hold fuel in contact with the entire anode, and
wherein the fuel container is comprised partly of the first and second proton conductors such that the first and second proton conductors at least partially enclose the anode.

2. The fuel cell as defined in claim 1, wherein the container is a closed container having a fuel supply port and a fuel discharge port.

3. The fuel cell as defined in claim 1, which is constructed such that at least the first cathode, the first proton conductor, a first anode, a spacer permeable to fuel, a second anode, the second proton conductor, and the second cathode are sequentially placed thereon.

4. The fuel cell as defined in claim 3, which further has a first current collector connected to the first cathode, a second current collector connected to the first anode, a third current collector connected to the second anode, and a fourth current collector connected to the second cathode.

5. The fuel cell as defined in claim 1, wherein the first cathode, the first proton conductor, the anode, the second proton conductor, and the second cathode include a plate-like or columnar shape.

6. The fuel cell as defined in claim 1, which is constructed such that at least a first spacer permeable to gas, the first cathode, the first proton conductor, the anode, the second proton conductor, the second cathode, and a second spacer permeable to gas are sequentially placed thereon.

7. The fuel cell as defined in claim 1, which is constructed such that at least the first cathode, the first proton conductor, the anode, the second proton conductor, and the second cathode are sequentially placed thereon in such a way that a central axis made of a gas-permeable material is encircled.

8. The fuel cell as defined in claim 1, wherein at least any one of the first cathode, the anode, and the second cathode has immobilized thereon an electron mediator in addition to the enzyme.

9. The fuel cell as defined in claim 1, wherein the anode has immobilized thereon enzymes including an oxidase that oxidizes and decomposes monosaccharides.

10. The fuel cell as defined in claim 9, wherein the enzymes include a coenzyme oxidase that returns the coenzyme, which has been reduced as the monosaccharide is reduced, to its oxidized form and transfers electrons to the anode through an electron mediator.

11. The fuel cell as defined in claim 10, wherein the coenzyme in oxidized form is $NAD^+$ and the coenzyme oxidase is diaphorase.

12. The fuel cell as defined in claim 9, wherein the oxidase is $NAD^+$-dependent glucose dehydrogenase.

13. The fuel cell as defined in claim 1, wherein the anode has immobilized thereon enzymes including a lyase that decomposes polysaccharides to give monosaccharides and an oxidase that oxidizes and decomposes the resulting monosaccharides.

14. The fuel cell as defined in claim 13, wherein the lyase is glucoamylase and the oxidase is $NAD^+$-dependent glucose dehydrogenase.

15. A fuel cell comprising:
a cathode and an anode facing each other with a proton conductor interposed therebetween, with at least either of the cathode or anode having an enzyme as a catalyst immobilized thereon,
wherein at least , a first anode, a first proton conductor, a cathode, a second proton conductor, and a second anode are sequentially placed thereon, and a fuel container holds fuel in contact with at least part of the first anode and at least part of the second anode, and
wherein the fuel container is comprised partly of the first and second proton conductors such that the first and second proton conductors at least partially enclose the first and second anodes.

16. An electronic device comprising:
one or more fuel cells, the fuel cell including a cathode and an anode facing each other with a proton conductor interposed therebetween, with at least either of the cathode or anode having an enzyme as a catalyst immobilized thereon,
wherein at least a first cathode, a first proton conductor, an anode, a second proton conductor, and a second cathode are sequentially placed thereon, and a fuel container encloses the anode to hold fuel in contact with the entire anode, and wherein the fuel container is comprised partly of the first and second proton conductors such that the first and second proton conductors at least partially enclose the anode.

17. An electronic device comprising one or more fuel cells, the fuel cell including a cathode and an anode facing each other with a proton conductor interposed therebetween, with at least either of the cathode or anode having an enzyme as a catalyst immobilized thereon, wherein at least a first anode, a first proton conductor, a cathode, a second proton conductor, and a second anode are sequentially placed thereon, and a fuel container holds fuel in contact with at least part of the first anode and at least part of the second anode, and wherein the fuel container is comprised partly of the first and second proton conductors such that the first and second proton conductors at least partially enclose the first and second anodes.

* * * * *